Aug. 8, 1939.    G. A. LYON    2,168,357
AUXILIARY IMPACT MEMBER
Filed Oct. 20, 1937
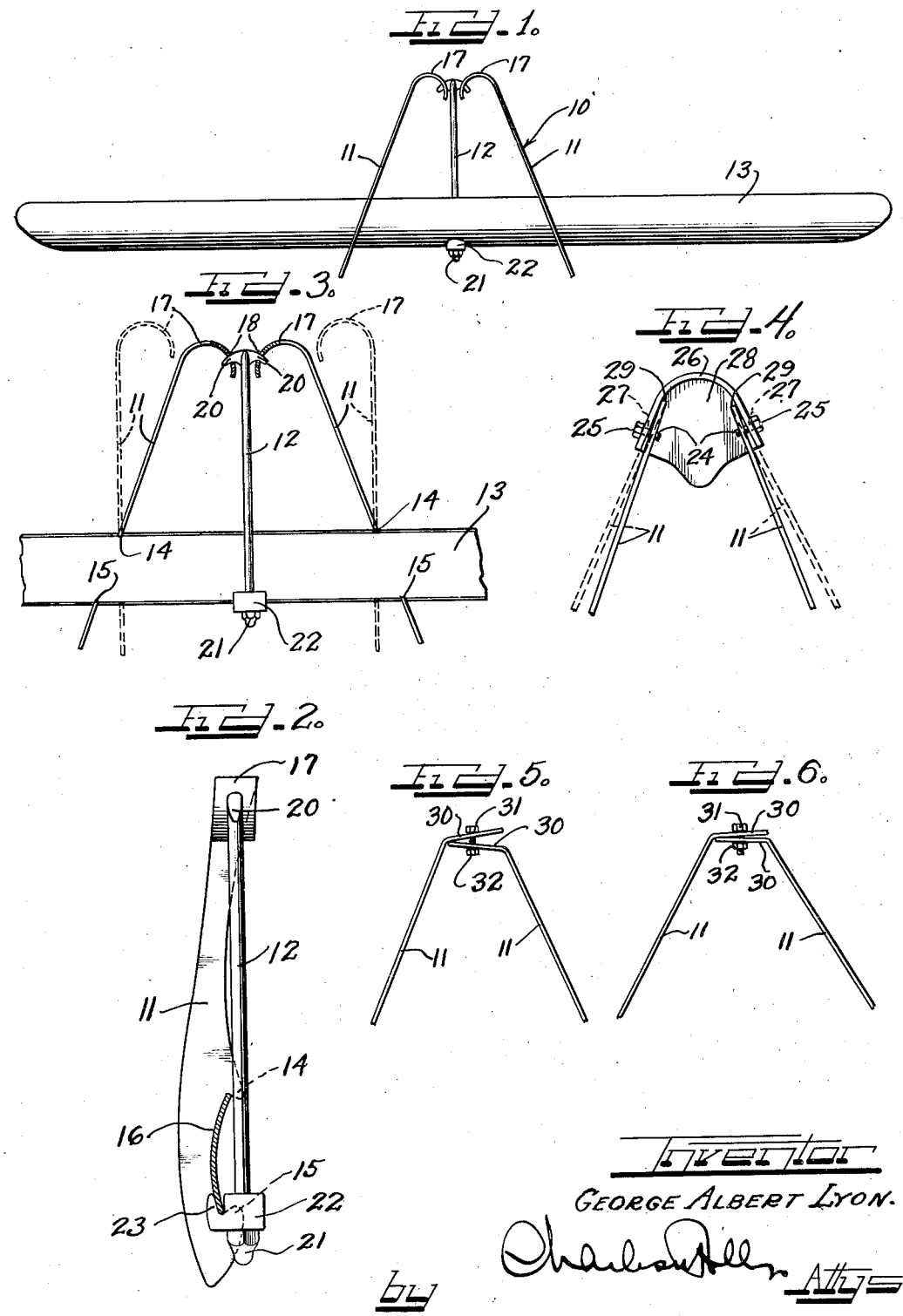
Inventor
GEORGE ALBERT LYON.

Patented Aug. 8, 1939

2,168,357

UNITED STATES PATENT OFFICE 2,168,357

AUXILIARY IMPACT MEMBER

George Albert Lyon, Allenhurst, N. J.

Application October 20, 1937, Serial No. 170,035

12 Claims. (Cl. 293—55)

This invention relates to an auxiliary impact member, and more particularly to an accessory which will increase the protection afforded by the bumper and which may be detachably secured to the bumper without drilling holes in the latter or otherwise altering or marring its construction.

Although the usual vehicle bumper or impact member, which is universally employed on automobiles of the present day, are satisfactory under most circumstances, it has been found that in many instances it is desirable to increase the protection which is afforded by the bumper by mounting thereon an auxiliary impact member which extends centrally upwardly from the main bumper. This has been found to be particularly desirable where a cast grille radiator front is used on the vehicle. The increased protection which is afforded by the auxiliary impact member prevents overhanging objects or unusually high bumpers on other vehicles from riding over the top of the main bumper and breaking the relatively expensive cast grille radiator front. In view of the fact that the auxiliary impact member can only be secured at its lower end, it is highly important that it be constructed of material which is sufficiently strong to resist the usual impact to which the vehicle bumper is subjected and also be secured to the vehicle bumper in such a manner that it cannot be ripped off. From a commercial standpoint, it is also desirable that the auxiliary impact member be equipped with a mounting means which will permit the impact member to be readily and quickly mounted on a vehicle bumper and preferably without altering the form and construction of the bumper. This last feature permits the auxiliary guard or impact member to be mounted on vehicle bumpers which are already in use.

It is an object of this invention to provide a novel auxiliary impact member having the above highly desirable characteristics.

Another object of this invention is to provide a novel bumper accessory or impact member which is economical to manufacture, which is rugged and reliable in use, and which may readily and conveniently be assembled on a vehicle bumper.

A further object of this invention is to provide a novel bumper accessory or impact member which may be detachably mounted on a vehicle bumper by means carried solely by the auxiliary impact member.

Another and further object of this invention is to provide a novel multipart auxiliary impact member which may be secured to a vehicle bumper in a novel manner.

Another and still further object of this invention is to provide a novel method and means for securing a bumper accessory or impact member to a vehicle bumper or other crossbar.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a front elevational view of a vehicle bumper having an auxiliary impact member mounted thereon, embodying the features of the present invention;

Figure 2 is a side elevational view partly in cross-section of the auxiliary impact member shown in Figure 1;

Figure 3 is a rear elevational view illustrated in the manner in which the auxiliary impact member of Figure 1 is assembled on the vehicle bumper;

Figure 4 is a rear elevational view of a modified form of an auxiliary impact member; and Figures 5 and 6 are elevational views illustrating a third embodiment of my invention.

The embodiment of this invention illustrated by Figures 1 to 3 of the drawing comprises an auxiliary impact member 10 having two downwardly extending legs 11 and a central vertical clamping rod 12 which is arranged to be mounted on a vehicle bumper 13. Although the exact shape and configuration of the vehicle bumper 13 is not of the essence of the present invention and may vary through wide limits without departing from the spirit and scope of the present invention, it has been illustrated as being of the usual type having a convex cross-sectional configuration (see Figure 2).

Legs 11 of the impact member 10 are preferably formed of some suitable sheet metal stock and given a shape similar to that illustrated in Figure 2. As may be seen upon a close inspection of Figure 2 of the drawing, the lower end of each leg 11 is provided with a pair of complementary, obliquely, rearwardly converging teeth 14 and 15. The rear edge of each leg 11 between tooth 14 and tooth 15 is cut out or otherwise shaped to intimately overlie the front face of bumper 13 as at 16. The upper end of each leg 11 is curled into a substantially semi-circular formation as at 17.

For a reason which will presently appear, an aperture 18 is provided near the free end of each curled portion 17.

As will be observed from a curstory inspection of Figure 3 of the drawing, complementary teeth 14 and 15 of each leg 11 are spaced so that the minimum distance between each tooth 14 and its complementary tooth 15 is greater than the vertical width of bumper 11. Each leg or impact bar 11 is retained in desired position on bumper 13 by virtue of the fact that the vertical distance between each tooth 15 and its complementary tooth 16 is less than the vertical width dimension of bumper 13 when the legs 11 are disposed in mounted position thereon. That is to say, that while the actual distance between the tips of one tooth 14 and its complementary tooth 15 is greater than the vertical width of the bumper, the vertical distance between the tooth 14 and its complementary tooth 15 may be lessened by rotating or angularly moving the leg 11 with respect to the horizontal bumper 13.

From the above description of the impact bars or legs 11 which form the auxiliary impact member 10, it will be apparent that if some means is provided for securing the upper ends of the legs 11 together and if in addition some means is provided for pulling or urging the upper ends of the legs 11 downwardly towards the bumper 13, a permanent and tight engagement of the legs or impact bars 11 will be made with the bumper 13.

As may be seen best in Figures 2 and 3 of the drawing, a clamping rod 12 is provided having a pair of oppositely extending arcuate shaped fingers 20 formed on the upper end thereof. The lower end of clamping rod 12 is threaded for the accommodation of a clamping nut 21. A bumper engaging clamping member 22 having a forwardly and then upwardly extending tongue member 23 is centrally apertured for the reception of the lower end of the clamping rod 12. It is to be understood that the member 22 is free to move along the rod 12. By hooking the arcuate shaped fingers 20 through the apertures 18 of legs 11 and by hooking the tongue 23 of clamping member 22 under the lower edge of bumper 13, it will be apparent that upon tightening of the clamping nut 21, the upper ends of the legs 11 are held tightly together and are urged downwardly until the complementary teeth 14 and 15 are securely hooked over and under the upper and lower edges respectively of bumper 13.

The manner in which the auxiliary impact member 10 is assembled on the bumper 11 is illustrated in Figure 3 of the drawing. The legs 11 are first moved into position against the front face of bumper 13 in the manner indicated by the dotted lines in Figure 3. It is to be remembered that when the legs 11 are in a substantially vertical position, the vertical distance between complementary teeth 14 and 15 is sufficient to permit these teeth to pass around the upper and lower edges of the bumper 13. The legs 11 are next brought inwardly and the arcuate shaped fingers 20 of clamping rod 12 are hooked through the apertures 18 of the legs 11. The clamping member 22 is then slid onto the lower end of rod 12 and the tongue 23 is hooked under the lower edge of bumper 11. Clamping nut 21 is then screwed onto the threaded lower end of clamping rod 12. As the nut 21 is tightened the upper ends of legs 11 are urged downwardly toward bumper 13, thus effecting a very tight engagement between the complementary teeth 14 and 15 of each leg 11 and the bumper 13.

To remove the auxiliary impact member 10 from bumper 13, it is simply necessary to remove the clamping nut 21, slide off the clamping member 22 and rock the legs 11 outwardly until they have again assumed approximately a vertical position, as shown by the dotted lines in Figure 3. In this position they may be lifted off of the bumper 13.

In Figure 4 of the drawing, a modification of the invention is illustrated. In this form of the invention, it is to be understood that the lower ends of the legs 11 are formed in precisely the same manner as the lower ends of the legs 11 in the preferred embodiment of the invention. However, the upper ends of the legs are not curled as previously described, but are simply provided with threaded apertures 24 which are arranged to accommodate clamping bolts 25. The upper ends of legs 11 are connected together by a U-shape connecting member 26 which is apertured as at 27 for the reception of the clamping bolt 25. As is shown in Figure 4 of the drawing, the U-shaped member 26 may be provided with a downwardly extending skirt 28 over the front face thereof in order to hide the upper ends of legs 11 and enhance the general appearance of the auxiliary impact assembly if desired. The upper extremities 29 of legs 11 are arranged to bear against the under surface of the U-shape member 26. As the clamping bolts 25 are tightened it will be observed that the legs 11 are spread further apart as is indicated by the dotted lines in Figure 4. As will readily be understood, when the legs 11 have advanced from the position shown by the full line in Figure 4, into the position shown by the dotted line in Figure 4, the angle which legs 11 make with the horizontal has been decreased. As a result of this, it will be apparent that upon tightening of the clamping bolts 25 the legs 11 are firmly hooked onto and engaged with bumper 13 by virtue of the engagement of the complementary teeth 14 and 15 therewith.

The manner in which the modification of the present invention shown in Figure 4 is assembled on the bumper 13 will now be described. Legs 11 are individually moved into position against the front face of bumper 13 in substantially a vertical position. The legs 11 are then rocked toward each other and the U-shaped member 26 slips over their upper ends. Clamping bolts 25 are then passed through apertures 27 and threaded into the threaded apertures 24 of legs 11. By means of a lug wrench or other suitable tool the clamping bolt is then tightened further until the complementary teeth 14 and 15 on the lower ends of legs 11 have made a tight engagement with the bumper 13.

A third embodiment of the present invention is illustrated in Figures 5 and 6 of the drawing. As was the case with the embodiment of the invention shown in Figure 4, only the upper part of the auxiliary impact assembly is shown. It is to be understood that the lower ends of the legs 11 in this form of the invention are precisely the same as those described in connection with the preferred embodiment of the invention and include a pair of complementary teeth 14 and 15 on each leg. The upper ends of legs 11 are secured together, however, in a somewhat different manner. As will be apparent from inspection of Figures 5 and 6 of the drawing, the upper ends of legs 11 are bent at a substantial angle to their direction of normal extension as is indicated at 30 and are furthermore bent in such a way that the end portion 30 of one leg 11 will overlap the edge portion 30 of the other leg 11 but in angular spaced relationship thereto. It is also to be understood that the legs or impact bars 11 are formed of substantially rigid material so that the end portions 30 will not be free to flex with respect to the main body portions of the legs. Complementary apertures are provided with the end portions 30 of each leg 11 for the reception of a clamping bolt 31. A clamping nut 32 is provided for the bolt 31. As the clamping nut 32 is tightened on the clamping bolt 31, it will be observed that the angle between the end portions 30 is decreased, thus causing spreading of the legs 11 such as is necessary to effect a tight engagement of the complementary teeth 14 and 15 with the bumper 13.

The manner in which the modification of the present invention shown in Figures 5 and 6 is assembled on the bumper 13 will now be described. The legs 11 are individually moved into position against the front face of bumper 13 in a substantially vertical position. The legs are then rocked toward each other until they have assumed approximately the position indicated in Figure 5. At this time the clamping bolt 31 is passed through the complementary apertures of the end portions 30 of each leg 11 and the clamping nut 32 is screwed onto the lower threaded end of the bolt 31. As the clamping bolt is now tightened by means of any suitable tool such as a lug wrench, the end portions 30 are forced closer together and the main body portion of the legs 11 are forced further apart until they have assumed approximately the position indicated in Figure 6 of the drawing. At this time, the complementary teeth 14 and 15 on the lower end of each leg 11 are tightly hooked over and under the upper and lower edges respectively of bumper 13. To dismount the auxiliary impact assembly shown in Figures 5 and 6 of the drawing it is simply necessary to remove the clamping nut 32, rotate the legs 11 into substantially a vertical position and then individually lift them off bumper 13.

From the above description, it will be seen that I have provided an extraordinarily simple and yet effective auxiliary multi-impact member assembly for vehicle bumpers which may be economically manufactured, readily and quickly mounted by an unskilled person on a vehicle bumper, and which is rugged and reliable in use. In each embodiment of the invention described, at least two auxiliary impact bars are employed to form the completed auxiliary impact member or assembly. In each case the auxiliary impact bars are provided with a pair of complementary, obliquely, rearwardly, converging teeth which are adapted to hook over and under the lower edges respectively of a vehicle bumper, the engagement of which are rendered effective upon rotating the upper ends of the impact bars toward each other and then clamping them together and urging them downwardly toward the main vehicle bumper.

While I have shown particular embodiments of my invention, it will, of course, be understood that I do not wish to be limited thereto since many modifications may be made, and I therefore contemplate by the appended claims to cover all such modifications as fall within the true spirit and scope of my invention.

I claim as my invention:

1. As an article of manufacture, an auxiliary multi-impact member assembly for vehicle bumpers comprising a pair of downwardly diverging impact legs, having their upper portions bent towards each other, each of said legs having a pair of complementary teeth thereon extending over and under the upper and lower edges respectively of a vehicle bumper, and means engaging said bent upper portions for urging said legs apart.

2. As an article of manufacture, an auxiliary multi-impact member assembly for vehicle bumpers comprising a pair of downwardly diverging impact legs having their upper portions bent towards each other, each of said legs having a pair of complementary teeth thereon extending over and under the upper and lower edges respectively of a vehicle bumper, and means engaging said bent upper portions for applying a force tending to decrease the angle which each leg makes with said bumper.

3. As an article of manufacture, an auxiliary multi-impact member assembly for vehicle bumpers comprising a pair of downwardly diverging impact legs, each of said legs having a pair of complementary teeth thereon extending over and under the upper and lower edges respectively of a vehicle bumper and a clamping member securing the upper ends of the said legs together and engaging said bumper, said clamping member being adapted to spread said legs further apart.

4. As an article of manufacture, an auxiliary multi-impact member assembly for vehicle bumpers comprising a pair of downwardly diverging impact legs having their upper ends bent towards each other, each of said legs having a pair of complementary teeth thereon extending over and under the upper and lower edges respectively of a vehicle bumper, and a clamping member engageable solely with the upper ends of said legs for holding them together and for spreading said legs apart.

5. An auxiliary impact device for vehicle bumpers comprising a pair of impact legs having means in proximity to their lower ends for overlapping and underlapping the upper and lower edges respectively of the vehicle bumper and having an aperture in their upper ends, a clamping member having fingers hooked through the apertures of said legs, and vertically adjustable fastening means on said clamping member hooked under said bumper, whereby the upper ends of said legs are held together and urged downwardly toward said bumper.

6. As an article of manufacture for vehicle bumpers, an auxiliary impact member comprising a pair of individual downwardly diverging impact legs, said legs having flexible lower portions as well as means thereon for detachably securing said legs to the vehicle bumper, and a clamp securing the upper ends of said legs together and constructed and arranged to deflect resiliently said flexible portions into retaining engagement with said bumper.

7. As an article of manufacture for vehicle bumpers, an auxiliary impact member comprising a pair of individual downwardly diverging impact legs, said legs having means thereon for detachably securing said members to the vehicle bumper, a U-shape connecting member detachably securing the upper ends of said legs together, and urging them to assume a predetermined angle with each other, said U-shape member having an ornamental skirt extending downwardly from the forward edge thereof.

8. As an article of manufacture for vehicle bumpers, an auxiliary impact member comprising a pair of individual downwardly diverging impact legs, said legs having means thereon for detachably securing said member to the vehicle bumper, a clamping member extending between the upper ends of said legs, and means for securing said clamping member to said legs including means for urging the lower ends of said legs apart.

9. As an article of manufacture for vehicle bumpers, an auxiliary impact member comprising a pair of individual downwardly extending impact legs having means thereon for securing them to a vehicle bumper, the upper ends of said legs being formed with their contacting faces in overlapping angularly spaced relationship with respect to each other, and means for adjustably clamping said overlapping portions of said legs together.

10. As an article of manufacture for vehicle bumpers, an auxiliary impact member comprising a pair of individual, downwardly, diverging impact legs, each of said legs having a pair of complementary teeth thereon extending around the upper and lower edges of a vehicle bumper for securing said member thereto, the upper ends of each of said legs being curled towards each other in substantially semi-circular form and having an aperture near their extremity, a clamping rod having oppositely extending arcuate-shaped fingers adjacent its upper end for extension through the apertures of said impact leg, and an adjustable means on the lower end of said clamping rod for hooking under the lower edge of said bumper whereby the upper end of said impact leg may be pulled downwardly toward said bumper.

11. In combination with a horizontally extending vehicle bumper, a pair of upwardly extending converging impact legs, each of said legs having a pair of complementary teeth in proximity to their lower ends extending over and under the upper and lower edges respectively of said bumper, and a clamping member for holding the upper ends of said legs together and urging the upper ends of said legs toward said bumper, said clamping member engaging the upper and outer surface of at least one of said legs.

12. In a bumper guard construction, means for increasing the impact area of a bumper comprising two members formed of steel plate, each of said members having a notch in one of its edges near one end, the notches having their openings as wide as the vertical dimension of the bumper and the bottoms of the notches being wider than their openings, said notches enabling said members to be hooked onto the bumper in planes perpendicular to the plane of the bumper but at oblique angles to the length of the bumper, and means for engaging said members and applying forces thereto tending to increase the obliqueness of said angles, said means engaging at least one of said members from the side of the plate which is farthest from the other member where said members engage the bumper.

GEORGE ALBERT LYON.